(12) United States Patent
Hiramatsu et al.

(10) Patent No.: US 11,284,253 B2
(45) Date of Patent: Mar. 22, 2022

(54) CAR SHARING SYSTEM

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Toshiki Hiramatsu, Aichi (JP); Masaki Hayashi, Aichi (JP); Masahiko Oya, Aichi (JP); Hidenobu Hanaki, Aichi (JP); Junji Murase, Aichi (JP); Yosuke Doi, Aichi (JP); Masaki Oshima, Aichi (JP); Yuichiro Haruna, Oyama (JP)

(73) Assignees: KABUSHIKI KAISHA TOKAI RIKA DENKI SEISAKUSHO, Aichi (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 231 days.

(21) Appl. No.: 16/151,822

(22) Filed: Oct. 4, 2018

(65) Prior Publication Data
US 2019/0110199 A1  Apr. 11, 2019

(30) Foreign Application Priority Data

Oct. 10, 2017 (JP) .............................. JP2017-196932

(51) Int. Cl.
*H04W 12/06* (2021.01)
*H04L 9/08* (2006.01)
(Continued)

(52) U.S. Cl.
CPC ........... *H04W 12/06* (2013.01); *H04L 9/0869* (2013.01); *H04L 9/3226* (2013.01);
(Continued)

(58) Field of Classification Search
CPC .... H04W 12/06; H04W 12/04; H04L 9/3226; H04L 9/0869; H04L 9/3271;
(Continued)

(56) References Cited

U.S. PATENT DOCUMENTS 9,119,069 B1 * 8/2015 Vipond ................. H04W 12/06
10,242,516 B2 * 3/2019 Konishi ................. B60R 25/04
(Continued)

FOREIGN PATENT DOCUMENTS

| CN | 105346502 | 2/2016 |
| CN | 106553617 | 4/2017 |

(Continued)

*Primary Examiner* — Robert B Leung
*Assistant Examiner* — Bruce S Ashley
(74) *Attorney, Agent, or Firm* — Greenblum & Bernstein, P.L.C.

(57) ABSTRACT

A car sharing system includes a car share device and a communication control unit. The car share device is configured to perform wireless communication with a mobile terminal that is operable as an electronic key. The communication control unit controls the wireless communication between the mobile terminal and the car share device so that an authentication process through bidirectional communication is executed only when a communication connection establishment process is performed. After the wireless communication has been established, the communication control unit controls the wireless communication so that actuation of an on-board device is permitted in accordance with operation of the mobile terminal through unidirectional communication from the mobile terminal to the car share device.

4 Claims, 4 Drawing Sheets

(51) Int. Cl.
*H04L 9/32* (2006.01)
*H04W 12/04* (2021.01)

(52) U.S. Cl.
CPC ........... *H04L 9/3271* (2013.01); *H04W 12/04* (2013.01); *H04L 2209/80* (2013.01); *H04L 2209/84* (2013.01)

(58) Field of Classification Search
CPC . H04L 2209/80; H04L 2209/84; B60R 25/00; B60R 25/24
See application file for complete search history.

(56) References Cited

U.S. PATENT DOCUMENTS

| | | | | |
|---|---|---|---|---|
| 10,474,823 | B2* | 11/2019 | Maletsky | H04L 63/0876 |
| 2011/0109447 | A1* | 5/2011 | Saguchi | G07C 9/00309 |
| | | | | 340/426.35 |
| 2012/0093312 | A1* | 4/2012 | Gammel | H04L 9/3271 |
| | | | | 380/255 |
| 2012/0303182 | A1* | 11/2012 | Choi | H04W 4/40 |
| | | | | 701/2 |
| 2012/0315848 | A1* | 12/2012 | Smith | H04B 5/0031 |
| | | | | 455/41.1 |
| 2014/0298023 | A1* | 10/2014 | Oppermann | G06F 21/60 |
| | | | | 713/168 |
| 2015/0304324 | A1* | 10/2015 | Kirsch | H04W 12/06 |
| | | | | 726/5 |
| 2016/0344747 | A1* | 11/2016 | Link, II | G06F 21/35 |
| 2017/0034766 | A1* | 2/2017 | Christ | H04M 1/72463 |
| 2017/0118178 | A1* | 4/2017 | Fruehling | H04L 63/0428 |
| 2017/0263066 | A1* | 9/2017 | Kang | G07C 9/00309 |
| 2017/0278329 | A1 | 9/2017 | Konishi | |

FOREIGN PATENT DOCUMENTS

| | | |
|---|---|---|
| JP | 2016-071834 | 5/2016 |
| JP | 2016-115077 | 6/2016 |

* cited by examiner

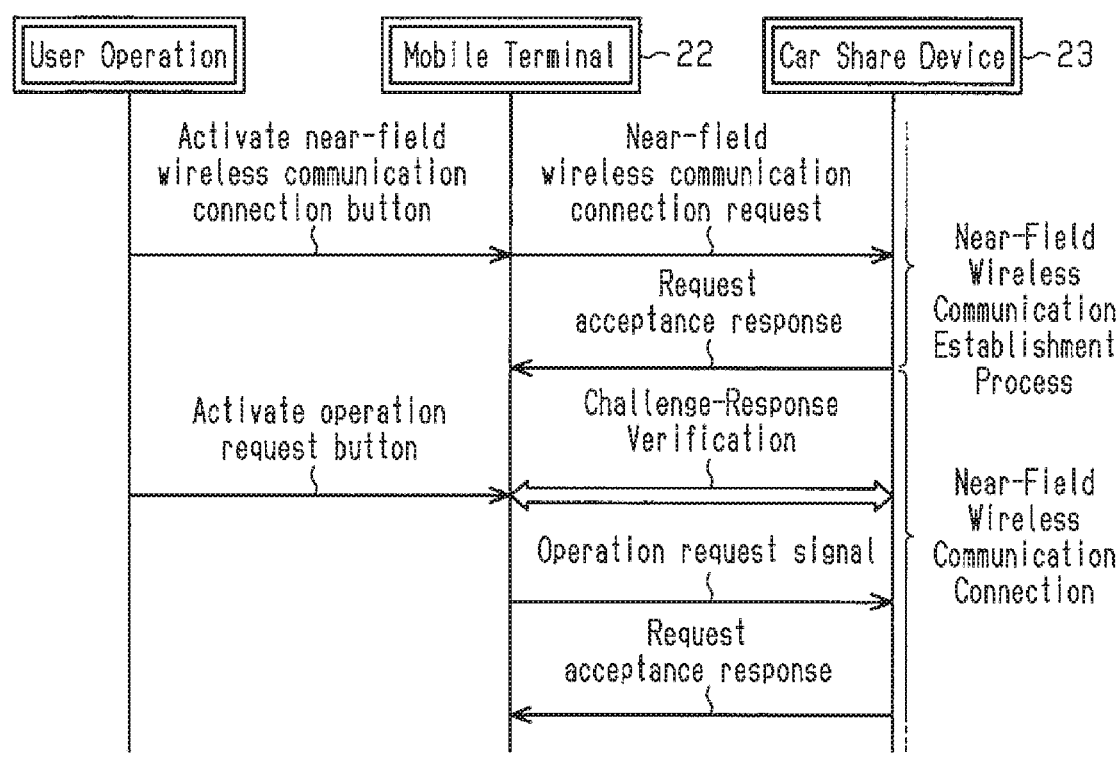

CAR SHARING SYSTEM

CROSS-REFERENCE TO RELATED APPLICATIONS

This application is based upon and claims the benefit of priority from prior Japanese Patent Application No. 2017-196932, filed on Oct. 10, 2017, the entire contents of which are incorporated herein by reference.

FIELD

This disclosure relates to a car sharing system that shares a vehicle with a number of people.

BACKGROUND

Japanese Laid-Open Patent Publication Nos. 2016-115077 and 2016-71834 describe a car sharing system that shares a vehicle with a number of people. In such type of a car sharing system, for example, after registering for usage of the car share system, a reservation for a car is made with a mobile terminal (e.g., smartphone) to obtain permission to use the vehicle during the reserved time.

SUMMARY

In the car sharing system, a car share device may be installed in a vehicle. The car share device is configured to establish communication with a mobile terminal. The car share device allows the mobile terminal to be used in place of an electronic key (vehicle key). The car share device communicates with the mobile terminal and uses a versatile electronic key system to actuate an on-board device. In such a car sharing system, there is a need to improve the response for actuating an on-board device when operating the mobile terminal while maintaining security.

One embodiment of a car sharing system includes a car share device and a communication control unit. The car share device is installed in a vehicle and configured to verify an electronic key ID used by an electronic key system of the vehicle. The car share device is configured to communicate with a mobile terminal that is operable as a vehicle key when code information is registered to the mobile terminal. The car share device is further configured to authenticate the code information through wireless communication with the mobile terminal and permit actuation of an on-board device by verifying the electronic key ID with the electronic key system when the mobile terminal is operated to actuate the on-board device. The communication control unit controls the wireless communication between the mobile terminal and the car share device so that an authentication process through bidirectional communication between the mobile terminal and the car share device is executed only when a communication connection establishment process is executed to establish the wireless communication and so that after the wireless communication is established, actuation of the on-board device is permitted in accordance with operation of the mobile terminal through unidirectional communication from the mobile terminal to the car share device.

Other embodiments and advantages thereof will become apparent from the following description, taken in conjunction with the accompanying drawings, illustrating by way of example the principles of the invention. It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which:

FIG. 5 is a diagram illustrating an example communication sequence for performing authentication process through bidirectional communication whenever requesting for actuation of an on-board device.

DESCRIPTION OF THE EMBODIMENTS

One embodiment of a car sharing system will now be described with reference to FIGS. 1 to 5.

Figure 1:
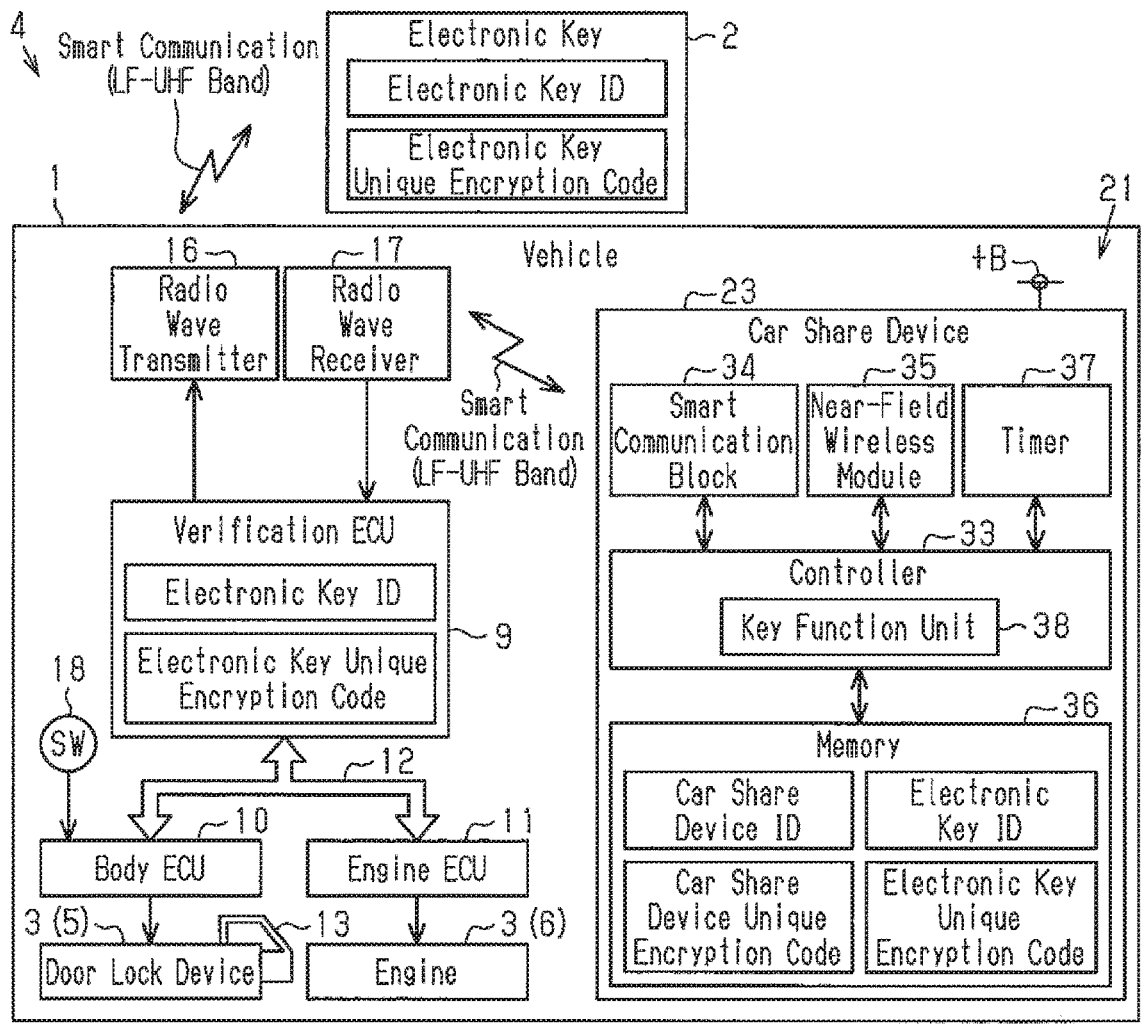
FIG. 1 is a schematic block diagram illustrating one embodiment of a car sharing system.

As illustrated in FIG. 1, a vehicle 1 is provided with an electronic key system 4. In one embodiment, the electronic key system 4 includes an electronic key 2 (vehicle key) and a verification electronic control unit (ECU) 9 that verifies the ID of the electronic key 2 through wireless communication with the electronic key 2. The verification ECU 9 executes or permits actuation of an on-board device 3 upon ID verification accomplishment of the electronic key 2. The electronic key system 4, which is a key-operation-free system, performs electronic key ID verification (also referred to as smart verification) through short range wireless communication initiated by the vehicle 1 (verification ECU 9). In the key-operation-free system, electronic key ID verification is automatically performed without directly operating the electronic key 2. The on-board device 3 may include, but not limited to, for example, a door lock device 5 and an engine 6.

The vehicle 1 includes the verification ECU 9, a body ECU 10 that manages the power supply for on-board electrical devices, and an engine ECU 11 that controls the engine 6. The body ECU 10 and the engine ECU 11 are each referred to as an on-board device ECU. The ECUs 9 to 11 are electrically connected to one another by a communication line 12 in the vehicle 1. The communication line 12 is, for example, a Controller Area Network (CAN), a Local Interconnect Network (LAN), or a combination of these networks. The verification ECU 9 and the electronic key 2 each include a memory (not illustrated) that stores an electronic key ID and an electronic key unique encryption code. The electronic key ID and the electronic key unique encryption code are information unique to the electronic key 2 that is registered to the vehicle 1 and used for electronic key ID verification. The body ECU 10 controls the door lock device 5 that locks and unlocks the vehicle door 13.

The electronic key system 4 further includes a radio wave transmitter 16 and a radio wave receiver 17 that are arranged in the vehicle 1. For example, the radio wave transmitter 16 may include an exterior transmitter (not illustrated) that transmits radio waves to the outside of the vehicle 1 and an interior transmitter (not illustrated) that transmits radio waves to the inside of the vehicle 1. The radio wave transmitter 16 transmits radio waves on the low frequency (LF) band. The radio wave receiver 17 receives radio waves on the ultrahigh frequency (UHF) band. Accordingly, in the electronic key system 4, the verification ECU 9 communicates with the electronic key 2 through LF-UHF bidirectional communication.

As the electronic key 2 enters a communication area formed by a wake signal on LF radio waves transmitted from the radio wave transmitter 16, the electronic key 2 receives the wake signal and shifts from a standby state to an activated state. Upon activation of the electronic key 2, the verification ECU 9 performs ID verification (smart verification) on the electronic key 2. In a non-restrictive example, the smart verification performed between the electronic key 2 and the verification ECU 9 includes electronic key ID verification that authenticates the electronic key 2 and challenge-response authentication that uses the electronic key unique encryption code. The electronic key ID verification performed under a situation in which the electronic key 2 is located outside the vehicle 1 is referred to as exterior smart verification. When exterior smart verification is accomplished, the verification ECU 9 permits or performs locking or unlocking of the vehicle door 13 with the body ECU 10.

The electronic key ID verification performed under a situation in which the electronic key 2 is located inside the vehicle 1 is referred to as interior smart verification. When interior smart verification is accomplished, the verification ECU 9 permits the shifting of devices supplied with power when an engine switch 18 is operated. For example, when the engine switch 18 is operated in a state in which the brake pedal is depressed, the verification ECU 9 starts the engine 6 with the engine ECU 11.

The vehicle 1 is provided with a car sharing system 21 that allows the vehicle 1 to be shared by a number of people. In the present example, the car sharing system 21 includes a car share device 23 installed in the vehicle 1. The car share device 23 is configured to verify the electronic key ID used by the electronic key system 4 of the vehicle 1. Further, the car share device 23 is configured to establish wireless communication with a mobile terminal 22. Encrypted code information Dk obtained from, for example, an external device such as a server (not illustrated) is registered to the mobile terminal 22. The car share device 23 obtains the code information Dk from the mobile terminal 22 and authenticates the code information Dk. In the present example, the car share device 23 includes an encryption code (car share device unique encryption code) used to decode the code information Dk. The code information Dk is authenticated when decoded. When the code information Dk is authenticated, the car share device 23 performs an authentication process through bidirectional wireless communication with the mobile terminal 22. When the authentication process is accomplished through bidirectional wireless communication, the car share device 23 accepts requests for actuating the on-board device 3 from the mobile terminal 22. The mobile terminal 22 may be, for example, a smartphone. Preferably, the code information Dk is, for example, a one-time key (one-time password) that can be used only once.

The car share device 23 is independent from the hardware configuration of the electronic key system 4 and may be retrofitted to the vehicle 1. The car share device 23, for example, functions as an electronic key (vehicle key) that is valid only during the reserved time of the vehicle 1 and is similar to a spare key. In the present example, the car share device 23 cooperates with the mobile terminal 22 so that the mobile terminal 22 functions as a vehicle key in place of the electronic key 2. The car share device 23 has an electronic key function that is switched between a valid state and an invalid state. A state in which the electronic key function of the car share device 23 is valid is equivalent to a state in which an electronic key exists in the vehicle 1. A state in which the electronic key function is invalid is equivalent to a state in which an electronic key does not exist in the vehicle 1. The car share device 23 is supplied with power from a battery +B of the vehicle 1.

In a non-restrictive example, the mobile terminal 22 includes a terminal control unit 26, a network communication module 27, a near-field wireless communication module 28, and a memory 29. The terminal control unit 26 controls the operation of the mobile terminal 22. The network communication module 27 is used to perform network communication between the mobile terminal 22 and an external device such as a server (not illustrated). The near-field wireless communication module 28 is used to perform near-field wireless communication between the mobile terminal 22 and the car share device 23. The memory 29 is a data rewritable memory. The mobile terminal 22 obtains the code information Dk from the server via the network communication module 27 and writes the code information Dk to the memory 29. The near-field wireless communication is performed in compliance with, for example, Bluetooth (registered trademark), preferably, Bluetooth® Low Energy (BLE).

A user interface (UI) application 30 is installed in the mobile terminal 22 to manage operation of the car sharing system 21. The UI application 30 is, for example, downloaded from a server and installed in the terminal control unit 26. In the present example, a user authentication code is registered to the memory 29 of the mobile terminal 22. The user authentication code is used when the mobile terminal 22 communicates with the car share device 23 of the vehicle 1 to actuate the on-board device 3 in accordance with the operation of the mobile terminal 22. The user authentication code may be included in, for example, the code information Dk. The user authentication code may be, for example, a random number of which value changes whenever generated. The user authentication code may be registered in advance to the car sharing system 21 or generated when the vehicle 1 is used.

In a non-restrictive example, the car share device 23 includes a controller 33, a smart communication block 34, a near-field wireless module 35, a memory 36, and a timer 37. The controller 33 controls operation of the car share device 23. The smart communication block 34 is used to establish smart communication (short range wireless communication) between the car share device 23 and the electronic key system 4 (verification ECU 9). The near-field wireless module 35 is used to establish near-field wireless communication between the mobile terminal 22 and the car share device 23.

The memory 36 is a data rewritable memory. The memory 36 stores a car share device ID, a car share device unique encryption code, the electronic key ID, and the electronic key unique encryption code. The car share device ID and the car share device unique encryption code are information unique to the car share device 23. The car share device unique encryption code is used to decode the code information Dk used for encrypted communication between the mobile terminal 22 and the car share device 23. The car share device unique encryption code may be stored in the server (not illustrated). The mobile terminal 22 may obtain the code information Dk, which is encrypted by the car share device unique encryption code, from the server. The car share device ID is, for example, associated with a vehicle ID (vehicle body number). This associates the car share device 23 with the vehicle 1. As described above, the electronic key ID and the electronic key unique encryption code are information unique to the electronic key 2 and used for electronic key ID verification (in the present example, smart verification) performed with the electronic key system 4. The timer 37 manages the date and time in the car share device 23. The timer 37 is implemented by, for example, a soft timer.

The car share device 23 includes a key function unit 38 that performs electronic key ID verification (in the present example, smart verification) through smart communication established by the smart communication block 34 between the electronic key system 4 (verification ECU 9) and the car share device 23. The key function unit 38 is arranged in the controller 33. For example, the car share device 23 includes one or more processors and a memory storing one or more instructions. The one or more processors execute instructions so that the controller 33 functions as the key function unit 38. The key function unit 38 obtains the code information Dk from the mobile terminal 22 and authenticates the code information Dk. When authentication of the code information Dk is accomplished in a normal manner, the key function unit 38 is allowed to perform electronic key ID verification through smart communication with the verification ECU 9. For example, when the mobile terminal 22 is operated to actuate the on-board device 3, the key function unit 38 performs electronic key ID verification (in the present example, smart verification) between the car share device 23 and the verification ECU 9 through a process similar to the electronic key ID verification performed between the electronic key 2 and the verification ECU 9. When electronic key ID verification is accomplished, actuation of the on-board device 3 is performed or permitted in accordance with operation of the mobile terminal 22.

The car sharing system 21 further includes a communication control unit 41 that controls wireless communication between the mobile terminal 22 and the car share device 23. For example, the communication control unit 41 is arranged in the terminal control unit 26 of the mobile terminal 22. The communication control unit 41 controls wireless communication so that the authentication process through bidirectional communication between the mobile terminal 22 and the car share device 23 is executed only when a communication connection establishment process is performed to establish wireless communication between the mobile terminal 22 and the car share device 23. In the present example, a challenge-response authentication is performed between the mobile terminal 22 and the car share device 23 as the authentication process through bidirectional communication. Further, the communication control unit 41 controls wireless communication so that after wireless communication is established, actuation of the on-board device 3 is permitted in accordance with operation of the mobile terminal 22 through unidirectional communication from the mobile terminal 22 to the car share device 23.

The operation of the car sharing system 21 will now be described with reference to FIGS. 2 to 5.

To actuate the on-board device 3 of the vehicle 1 by operating the mobile terminal 22, the car share device 23 first authenticates the code information Dk by establishing wireless communication with the mobile terminal 22. In the present example, near-field wireless communication (Bluetooth) is performed as the wireless communication. However, other types of wireless communication may be performed instead. The code information Dk of the mobile terminal 22 is transmitted through near-field wireless communication to the car share device 23. When the car share device 23 receives the code information Dk, the car share device 23 decodes the code information Dk with a certain encryption code (in the present example, car share device unique encryption code). If the code information Dk cannot be correctly decoded, the mobile terminal 22 cannot be used as the electronic key.

If the code information Dk is correctly decoded, authentication of the code information Dk is accomplished, and the car share device 23 writes the user authentication code included in the code information Dk to the memory 36 of the car share device 23. In this state, an authentication process through bidirectional communication between the mobile terminal 22 and the car share device 23 can be performed. In the present example, challenge-response authentication using the user authentication code is executed as the authentication process through bidirectional communication.

Operation in Normal Situation

Figure 2:
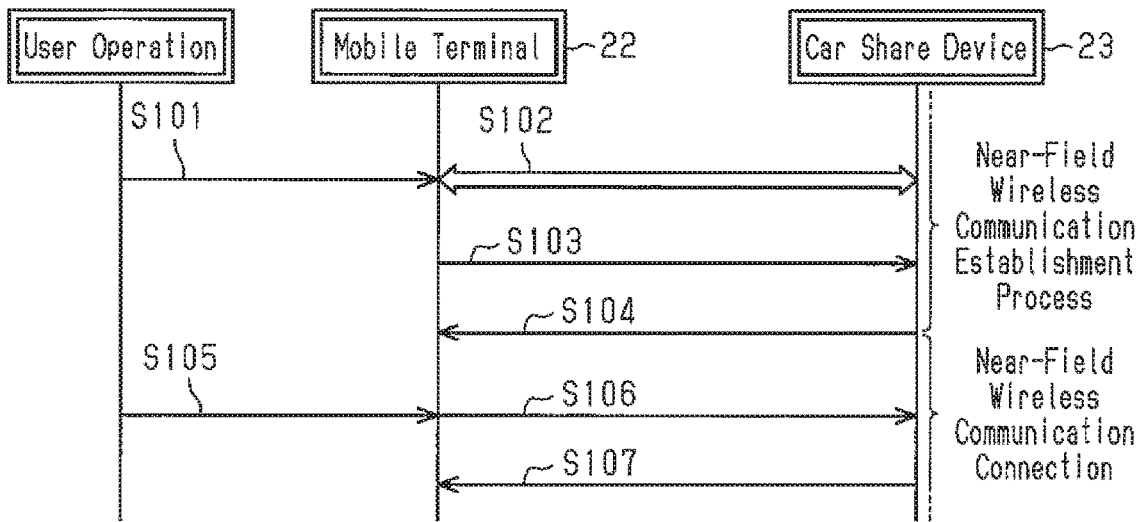
FIG. 2 is a diagram illustrating an example communication sequence for a normal situation.

An operation performed in a normal situation will now be described with reference to FIG. 2. A normal situation operation refers to an operation that an authorized user performs to actuate the on-board device 3 of the vehicle 1 (share vehicle) with the mobile terminal 22.

In step S101, the user operates and activates a near-field wireless communication connection button with the mobile terminal 22. The near-field wireless communication connection button is, for example, a BLE connection button shown in the display of the mobile terminal 22.

In step S102, when the UI application 30 of the mobile terminal 22 detects that the BLE connection button has been operated, the communication control unit 41 executes a communication connection establishment process to establish wireless communication (BLE) between the mobile terminal 22 and the car share device 23. For example, the communication control unit 41 sets a communication mode to a communication connection initiation mode to initiate the communication connection establishment process. When the communication connection establishment process is initiated, an authentication process (in the present example, challenge-response authentication) is executed through bidirectional communication between the mobile terminal 22 and the car share device 23.

In a non-restrictive example, the challenge-response authentication is performed in the following manner. The car share device 23 first transmits a challenge code to the mobile terminal 22. The challenge code is a random number of which the value changes whenever the challenge-response authentication is executed. The mobile terminal 22 uses the user authentication code stored in the memory 29 to calculate a response code from the received challenge code. The mobile terminal 22 transmits the calculated response code to the car share device 23.

The user authentication code has already been obtained by the car share device 23 through the authentication of the code information Dk. The car share device 23 uses the user authentication code stored in the memory 36 to calculate the response code from the challenge code transmitted to the mobile terminal 22. The car share device 23 compares the calculated response code with the response code transmitted from the mobile terminal 22. The car share device 23 determines that the challenge-response authentication has been accomplished when the two response codes match.

In step S103, when the challenge-response authentication is accomplished, the UI application 30 of the mobile terminal 22 transmits a near-field wireless communication connection request to the car share device 23. In response to the near-field wireless communication connection request, the car share device 23 establishes near-field wireless communication (in the present example, BLE) with the mobile terminal 22. When BLE is established, BLE connection between the mobile terminal 22 and the car share device 23 is maintained.

In step S104, the car share device 23 transmits a request acceptance response to the mobile terminal 22 notifying the establishment of near-field wireless communication (BLE). Upon receipt of the request acceptance response, the mobile terminal 22 notifies the user that near-field wireless communication connection has been established by, for example, indicating such a state on its display. After near-field wireless communication (BLE) is established between the mobile terminal 22 and the car share device 23, the communication control unit 41 sets the BLE communication to unidirectional communication from the mobile terminal 22 to the car share device 23. For example, the communication control unit 41 sets the communication mode to a unidirectional communication mode that permits actuation of the on-board device 3 according to operation of the mobile terminal 22 through unidirectional communication from the mobile terminal 22 to the car share device 23.

When the car share device 23 transmits the request acceptance response to the mobile terminal 22 (S104), the car share device 23 switches the key function unit 38 from an invalid state to a valid state. This allows the key function unit 38 to verify the electronic key ID used by the electronic key system 4. When the key function unit 38 is valid, the mobile terminal 22 and the car share device 23 have both been authenticated. Thus, the mobile terminal 22 can be used in place of the electronic key 2 as the electronic key (vehicle key) of the vehicle 1.

In step S105, the user operates and activates an operation request button of the mobile terminal 22. The operation request button is used to actuate the on-board device 3 and may be, for example, an unlock request button for unlocking the vehicle door 13, a lock request button for locking the vehicle door 13, an engine start button for starting the engine 6, or the like.

In step S106, the UI application 30 of the mobile terminal 22 transmits an operation request signal, which corresponds to the operation request button, to the car share device 23. In a non-restrictive example, the operation request signal may include the electronic key ID, the electronic key unique encryption code, and a device actuation command corresponding to the operation request button.

In step S107, when the car share device 23 receives the operation request signal, the car share device 23 transmits a request acceptance response to the mobile terminal 22. Further, the car share device 23 communicates with the electronic key system 4 to actuate the on-board device 3 in accordance with the received operation request signal. In a non-restrictive example, the car share device 23 establishes smart communication between the electronic key system 4 and the verification ECU 9 with the smart communication block 34 and sends a device actuation command and the electronic key ID to the verification ECU 9. The verification ECU 9 performs electronic key ID verification. When accomplishing electronic key ID verification, the verification ECU 9 sends the device actuation command to the on-board device ECU of the corresponding on-board device 3 and actuates the on-board device 3.

For example, if the device actuation command is an unlock request command for the vehicle door 13, the body ECU 10 actuates the door lock device 5 to unlock the vehicle door 13. If the device actuation command is a lock request command for the vehicle door 13, the body ECU 10 actuates the door lock device 5 to lock the vehicle door 13. If the device actuation command is a starting request command for the engine 6, the engine ECU 11 permits starting of the engine 6. For example, if the engine switch 18 is operated when the brake pedal is depressed, the engine ECU 11 starts the engine 6. In addition to electronic key ID verification, challenge-response authentication using the electronic key unique encryption code may be performed between the verification ECU 9 and the car share device 23 if necessary. In this manner, smart verification may be performed between the car share device 23 and the verification ECU 9 in the same manner as the smart verification performed between the electronic key 2 and the verification ECU 9.

Operation Simulating Theft

Figure 3:
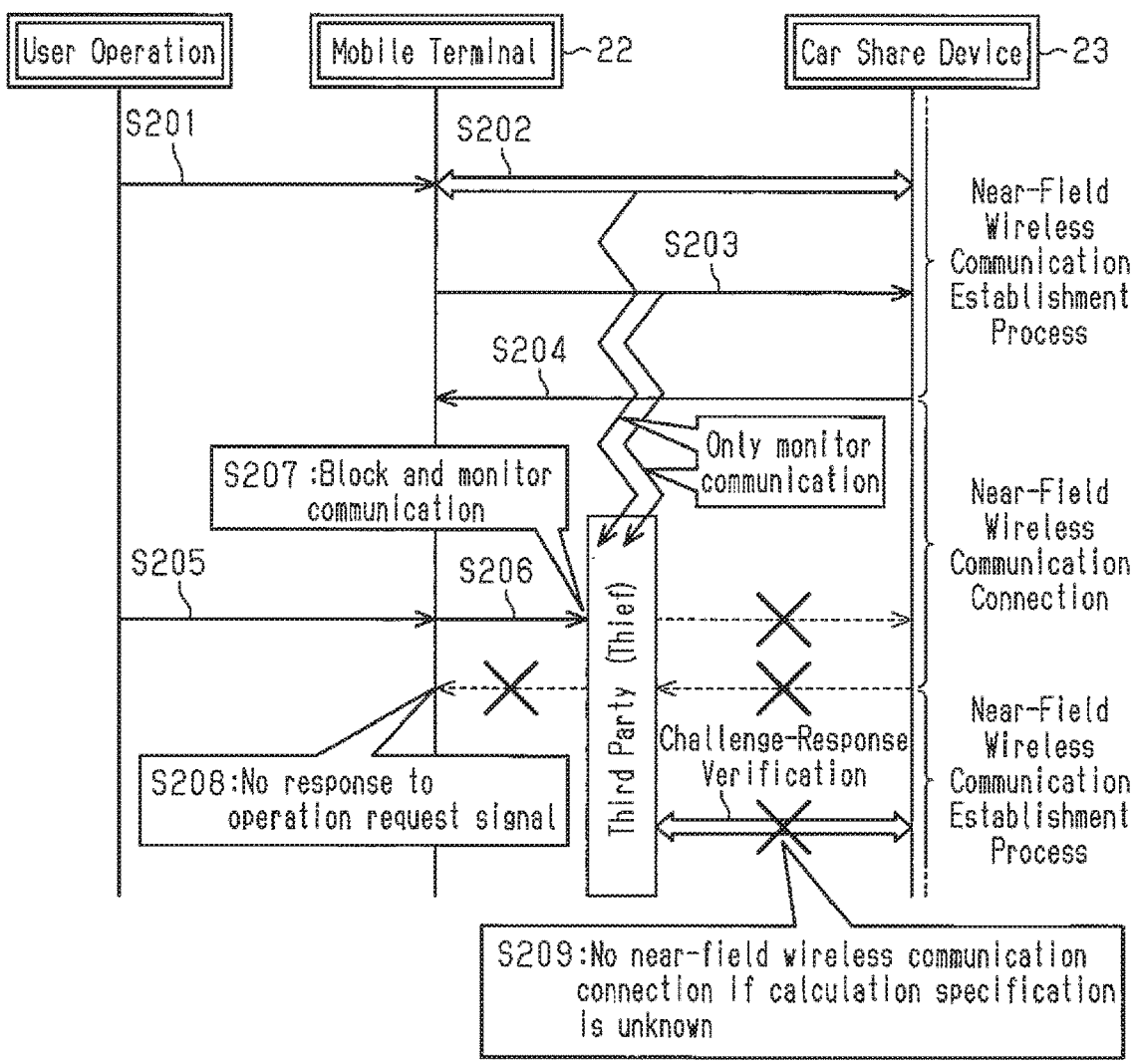
FIG. 3 is a diagram illustrating an example communication sequence for a situation simulating theft.

An operation performed in a situation simulating theft will now be described with reference to FIG. 3. The operation simulating theft refers to, for example, the operation simulating a case in which a third party (thief) monitors the connection establishment process of near-field wireless communication connection with a monitoring device and, subsequent to establishment of wireless communication, blocks and monitors unidirectional communication (operation request signal transmitted from mobile terminal 22 to car share device 23). Steps S201 to S206 of FIG. 3 respectively correspond to steps S101 to S106 of FIG. 2 and thus will not be described below.

In step S207, a third party (thief) blocks and monitors near-field wireless communication (i.e., operation request signal) to obtain the operation request signal in an unauthorized manner. In this case, the operation request signal does not reach the car share device 23 and thus does not actuate the car share device 23. The thief that has obtained the operation request signal temporarily goes away from the vehicle 1.

In step S208, the mobile terminal 22 does not receive a request acceptance response to the operation request signal (S206). In this case, the on-board device 3 of the vehicle 1 is not actuated even though the user has operated the operation request button of the mobile terminal 22. Thus, the user operates the mobile terminal 22 again, and the mobile terminal 22 sends an operation request signal to the car share device 23. Since the thief has left the vehicle 1, the on-board device 3 of the vehicle 1 is actuated in accordance with the operation request signal as described in step S106. Then, after the vehicle 1 is used, the vehicle 1 is shifted to a parked state (door locked and engine stopped).

In step S209, the third party (thief) attempts to use the parked vehicle 1 in an unauthorized manner. In this case, the challenge-response authentication needs to be accomplished through communication with the car share device 23. However, the thief does not know the specifications for calculating the challenge-response authentication. Thus, near-field wireless communication is not established. This prevents unauthorized use of the vehicle 1 by the thief.

Figure 4:
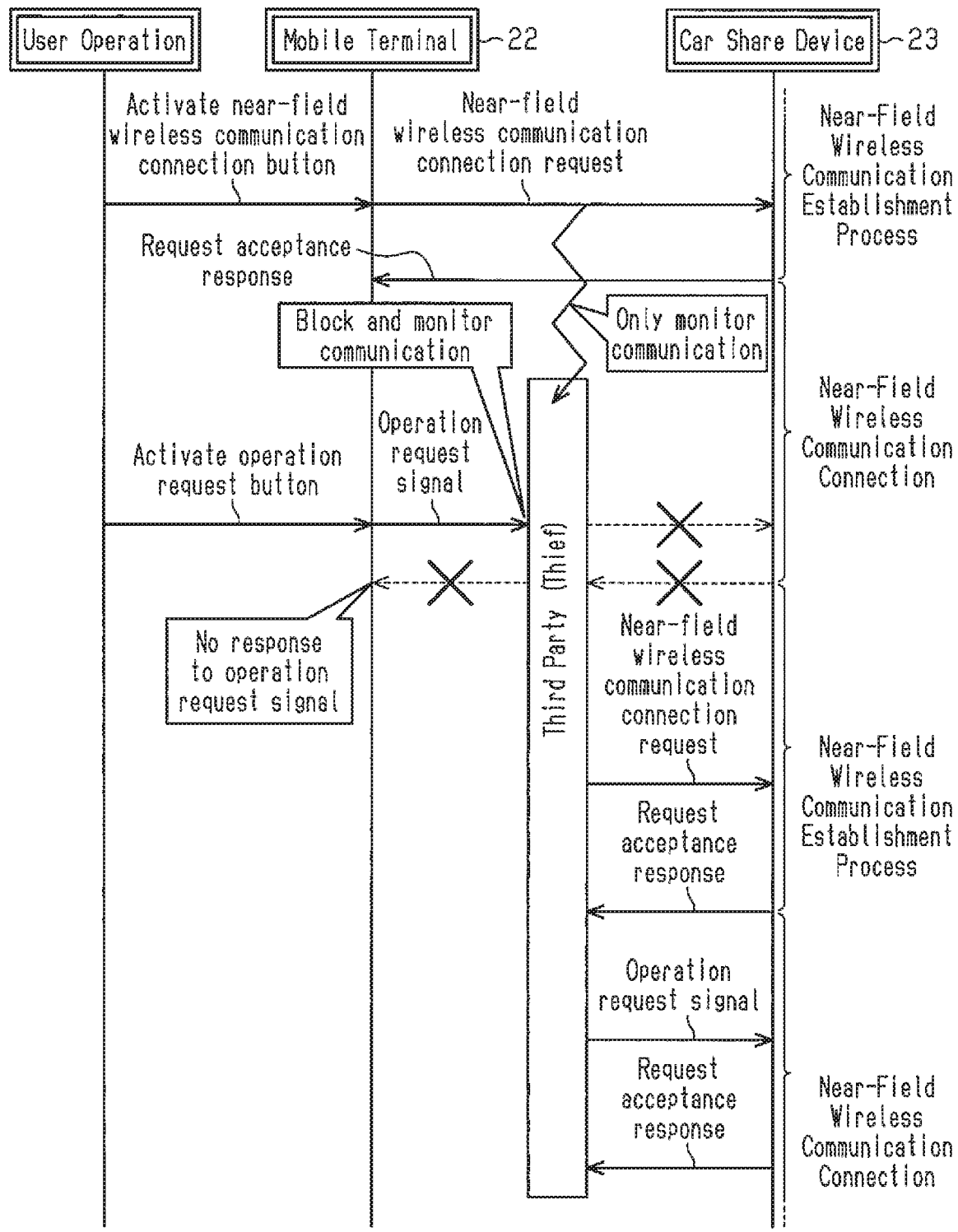
FIG. 4 is a diagram illustrating an example communication sequence for actuating an on-board device through only unidirectional communication without performing authentication process through bidirectional communication.

FIG. 4 illustrates an example of a communication sequence for a case in which the on-board device 3 would be actuated through only unidirectional communication between the mobile terminal 22 and the car share device 23 without performing the authentication process through bidirectional communication. As illustrated in FIG. 4, a third party (thief) blocks and monitors unidirectional communication (operation request signal) from the mobile terminal 22 to the car share device 23. Then, after the thief interrupts near-field wireless communication once (establishment failure), the thief transmits a near-field wireless communication connection request to the car share device 23 and attempts to establish communication. In this case, the authentication process performed through bidirectional communication does not require the communication connection establishment process. Thus, the car share device 23 transmits a request acceptance response when receiving the connection request. This establishes near-field wireless communication between the mobile terminal of the thief and the car share device 23 and allows the thief to use the vehicle 1 without authorization by sending the monitored operation request signal to the car share device 23.

FIG. 5 illustrates an example of an improvement to the communication sequence of FIG. 4. In the communication sequence of FIG. 5, whenever the mobile terminal 22 transmits an operation request signal to the car share device 23, an authentication process through bidirectional communication (e.g., challenge-response authentication) would have to be executed. In such a communication sequence, the mobile terminal 22 executes the challenge-response authentication whenever actuating the on-board device 3. This prolongs the communication time. Thus, the communication response is poor. In contrast, in the communication sequence of the present example illustrated in FIG. 2, the challenge-response authentication is executed only when the communication connection establishment process is performed for the first time. After wireless communication is established, actuation of the on-board device 3 is permitted through unidirectional communication from the mobile terminal 22 to the car share device 23. This improves the communication response while maintaining security against unauthorized use of the vehicle 1.

The car sharing system 21 of the present embodiment has the advantages described below.

An authentication process through bidirectional communication is executed only when the communication connection establishment process for near-field wireless communication is performed. Once wireless communication is established, actuation of the on-board device 3 is permitted through unidirectional communication from the mobile terminal 22 to the car share device 23. Thus, the entire communication time is shortened because an authentication process through bidirectional communication is not executed once wireless communication is established and also because actuation of the on-board device 3 is permitted through unidirectional communication. This improves the response when actuating the on-board device 3 by operating the mobile terminal 22 while maintaining security against unauthorized use of the vehicle 1.

The authentication process through bidirectional communication is a challenge-response authentication. Thus, the security of communication between the mobile terminal 22 and the car share device 23 is obtained through the challenge-response authentication.

After communication is established, the mobile terminal 22 only needs to transmit an operation request signal to the car share device 23 to actuate the on-board device 3 in accordance with the operation request signal. In this manner, the mobile terminal 22 actuates the on-board device 3 through unidirectional communication. This improves the operation response.

It should be apparent to those skilled in the art that the foregoing embodiments may be implemented in many other specific forms without departing from the scope of this disclosure. Particularly, it should be understood that the foregoing embodiments may be implemented in the following forms.

The authentication process performed through bidirectional communication is not limited to challenge-response authentication and may be a different authentication.

Any encryption code may be used for the authentication process performed through bidirectional communication (challenge-response authentication) and the encryption process performed through unidirectional communication.

The communication control unit 41 does not have to be arranged in the mobile terminal 22 (terminal control unit 26) and may be arranged in another device such as the car share device 23.

The code information Dk does not have to be encrypted with the car share device unique encryption code and may be encrypted with another encryption code.

The content of the code information Dk may be changed to one other than that of the above embodiment.

The code information Dk does not have to be generated by the server and may be generated by any other external device.

The condition for switching the key function unit 38 from an invalid state to a valid state is not limited to the condition described above and may be any condition.

The engine 6 may be started by, for example, operating an "engine start" button shown on the display of the mobile terminal 22.

In the smart verification of the key-operation-free system (electronic key system 4), the exterior transmitter and the interior transmitter do not have to be used to determine whether the electronic key 2 is located inside the vehicle 1 or outside the vehicle 1. For example, left and right antennas (LF antennas) may be arranged on the vehicle body, and the combination of the response of the electronic key 2 to the radio waves transmitted from each antenna may be checked to determine whether the electronic key 2 is located inside the vehicle 1 or outside the vehicle 1.

The smart verification of the electronic key system 4 does not have to perform both electronic key ID verification and challenge-response authentication. As long as electronic key ID verification is performed, any verification process may be performed. Further, any authentication may be performed in lieu of the challenge-response authentication.

In the electronic key system 4, instead of using the verification ECU 9, the electronic key 2 may initiate wireless communication and execute electronic key ID verification.

The electronic key 2 is not limited to a Smart Key (registered trademark) and may be any other wireless key.

The near-field wireless communication is not limited to Bluetooth communication and may be of any type of communication protocol.

The code information Dk is not limited to a one-time key and may be any information of which use is restricted.

The encryption code used for encrypted communication may be, for example, any one of the car share device unique encryption code, the user authentication code, and the electronic key unique encryption code. For example, the encryption code used during a process may be switched to improve communication security.

Communication between the verification ECU 9 (electronic key system 4) and the car share device 23 is not limited to wireless communication and may be wired communication.

There is no limit to where the car share device 23 is installed.

The mobile terminal 22 is not limited to a smartphone and may be any other mobile terminal.

All examples and conditional language recited herein are intended for pedagogical purposes to aid the reader in understanding the principles of the invention and the concepts contributed by the inventors to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

What is claimed is:

1. A car sharing system comprising:
a car share device installed in a vehicle and configured to verify an electronic key ID used by an electronic key system of the vehicle, wherein the car share device is configured to perform near-field wireless communication with a mobile terminal that is operable as a vehicle key when code information is registered to the mobile terminal, and the car share device is further configured to authenticate the code information through the near-field wireless communication with the mobile terminal and permit actuation of an on-board device by verifying the electronic key ID with the electronic key system when the mobile terminal is operated to actuate the on-board device; and
a communication control unit that controls the near-field wireless communication between the mobile terminal and the car share device so that a challenge-response authentication through bidirectional communication between the mobile terminal and the car share device is executed only when a communication connection establishment process is executed to establish the near-field wireless communication and so that after the near-field wireless communication is established, actuation of the on-board device is permitted in accordance with operation of the mobile terminal through unidirectional communication from the mobile terminal to the car share device, wherein:
the car share device includes a key function unit that performs electronic key ID verification with a verification Electronic Control Unit (ECU) in the vehicle; and
when the near-field wireless communication has been established, the car share device switches the key function unit from an invalid state to a valid state to allow the key function unit to perform the electronic key ID verification so that the actuation of the on-board device is permitted in accordance with the operation of the mobile terminal through the unidirectional communication upon accomplishment of the electronic key ID verification.

2. The car sharing system according to claim 1, wherein:
the mobile terminal transmits an operation request signal corresponding to operation of the mobile terminal to the car share device through the unidirectional communication after the near-field wireless communication is established; and
the car share device actuates the on-board device in accordance with a device actuation command included in the operation request signal.

3. The car sharing system according to claim 1, wherein:
the car share device obtains the code information from the mobile terminal when using the vehicle for a first time and verifies the code information with a certain encryption code; and
the communication control unit initiates the communication connection establishment process if the mobile terminal is operated when the code information has been verified.

4. The car sharing system according to claim 1, wherein the challenge-response authentication process through the bidirectional communication is executed using an encryption code included in the code information.

* * * * *